United States Patent
Mizuguchi et al.

(10) Patent No.: US 8,463,738 B2
(45) Date of Patent: Jun. 11, 2013

(54) ATTRIBUTE EXTRACTION METHOD, SYSTEM, AND PROGRAM

(75) Inventors: Hironori Mizuguchi, Tokyo (JP); Masaaki Tsuchida, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 12/866,215

(22) PCT Filed: Mar. 5, 2009

(86) PCT No.: PCT/JP2009/054170
§ 371 (c)(1), (2), (4) Date: Aug. 4, 2010

(87) PCT Pub. No.: WO2009/110550
PCT Pub. Date: Sep. 11, 2009

(65) Prior Publication Data
US 2010/0318525 A1 Dec. 16, 2010

(30) Foreign Application Priority Data
Mar. 6, 2008 (JP) .................. 2008-055789

(51) Int. Cl.
*G06F 17/30* (2006.01)
(52) U.S. Cl.
USPC ............ 707/602; 707/736; 707/737; 715/227
(58) Field of Classification Search
USPC .................... 707/602, 736, 737; 715/227
See application file for complete search history.

(56) References Cited

U.S. PATENT DOCUMENTS

| | | | | |
|---|---|---|---|---|
| 5,666,549 A | * | 9/1997 | Tsuchiya et al. | 715/223 |
| 2001/0046036 A1 | * | 11/2001 | Honma | 355/18 |
| 2007/0081179 A1 | * | 4/2007 | Nishida | 358/1.11 |

FOREIGN PATENT DOCUMENTS

| | | |
|---|---|---|
| JP | 2-116970 A | 5/1990 |
| JP | 4-319770 A | 11/1992 |
| JP | 11-259524 A | 9/1999 |

OTHER PUBLICATIONS

International Search Report for PCT/JP2009/054170 mailed Apr. 7, 2009.

* cited by examiner

*Primary Examiner* — Khanh Pham

(57) ABSTRACT

Sets of strings of which the drawing positions are arranged in one direction are extracted from a document as attribute groups. An attribute name score is calculated for each attribute group to determine an extent to which each attribute group is a set of attribute names. Based on the attribute name scores, an attribute name group is selected out of the attribute groups. From among the attribute groups, an attribute group which includes a string which is the same as at least one string of the attribute name group and of which the drawing position is the same as that of the string of the attribute name group is selected. From the string at the same drawing position, an attribute name is extracted. From the other strings of the selected attribute group than those at the same drawing position, an attribute value corresponding to the attribute name is extracted.

18 Claims, 12 Drawing Sheets

FIG. 2

| INPUT WORD |
|---|
| PRODUCT A |
| PRODUCT B |
| PRODUCT C |
| PRODUCT D |
| PRODUCT E |

FIG. 3

| DOCUMENT ID | DOCUMENT DATA |
|---|---|
| DOCUMENT A | <html>···<h1>PRODUCT A</h1><tr><td>CPU</td><td>1 GHz</td>···<tr>... |
| DOCUMENT B | <html>···<font size="10">PRODUCT B</font><br> |
| DOCUMENT C | <html>···<tr><td>ENTERPRISE A</td><td>··· |
| DOCUMENT D | ···PRICE:234, ··· |
| ... | ······ |

FIG. 4

| DELIMITING PATTERN |
|---|
| <td>*</td> |
| <li>*</li> |
| <h1>*</h1> |
| : |
| ` |
| ... |

FIG. 5

| DOCUMENT ID | INPUT WORD | GROUP ID | WORD | X1, Y1 | X2, Y2 | SCORE |
|---|---|---|---|---|---|---|
| DOCUMENT A | PRODUCT A | 1 | CPU | 10, 10 | 40, 20 | |
| DOCUMENT A | PRODUCT A | 1 | HDD | 10, 20 | 40, 30 | |
| DOCUMENT A | PRODUCT A | 1 | PRICE | 10, 30 | 40, 40 | |
| DOCUMENT A | PRODUCT A | 2 | CPU | 10, 10 | 40, 20 | |
| DOCUMENT A | PRODUCT A | 2 | 1 GHz | 40, 10 | 80, 20 | |
| DOCUMENT A | PRODUCT A | 3 | HDD | 10, 20 | 40, 30 | |
| ... | | ... | ... | ... | ... | ... ... |

| DOCUMENT ID | INPUT WORD | GROUP ID | WORD | X1, Y1 | X2, Y2 | SCORE |
|---|---|---|---|---|---|---|
| DOCUMENT A | PRODUCT A | 1 | CPU | 10, 10 | 40, 20 | 5/300 |
| DOCUMENT A | PRODUCT A | 1 | HDD | 10, 20 | 40, 30 | 5/300 |
| DOCUMENT A | PRODUCT A | 1 | PRICE | 10, 30 | 40, 40 | 20/300 |
| DOCUMENT A | PRODUCT A | 2 | CPU | 10, 10 | 40, 20 | 5/300 |
| DOCUMENT A | PRODUCT A | 2 | 1 GHz | 40, 10 | 80, 20 | 3/300 |
| DOCUMENT A | PRODUCT A | 3 | HDD | 10, 20 | 40, 30 | 5/300 |
| ... | | ... | ... | ... | ... | ... ... |

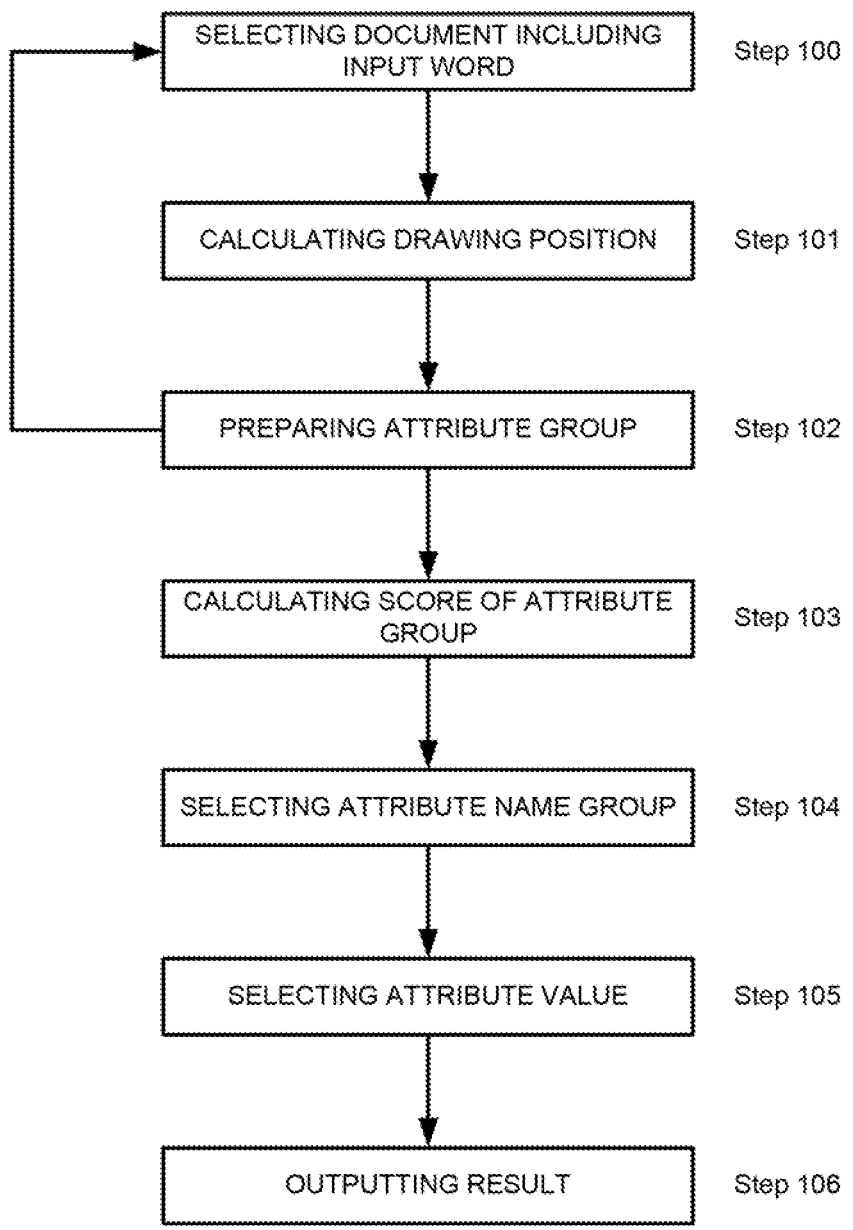

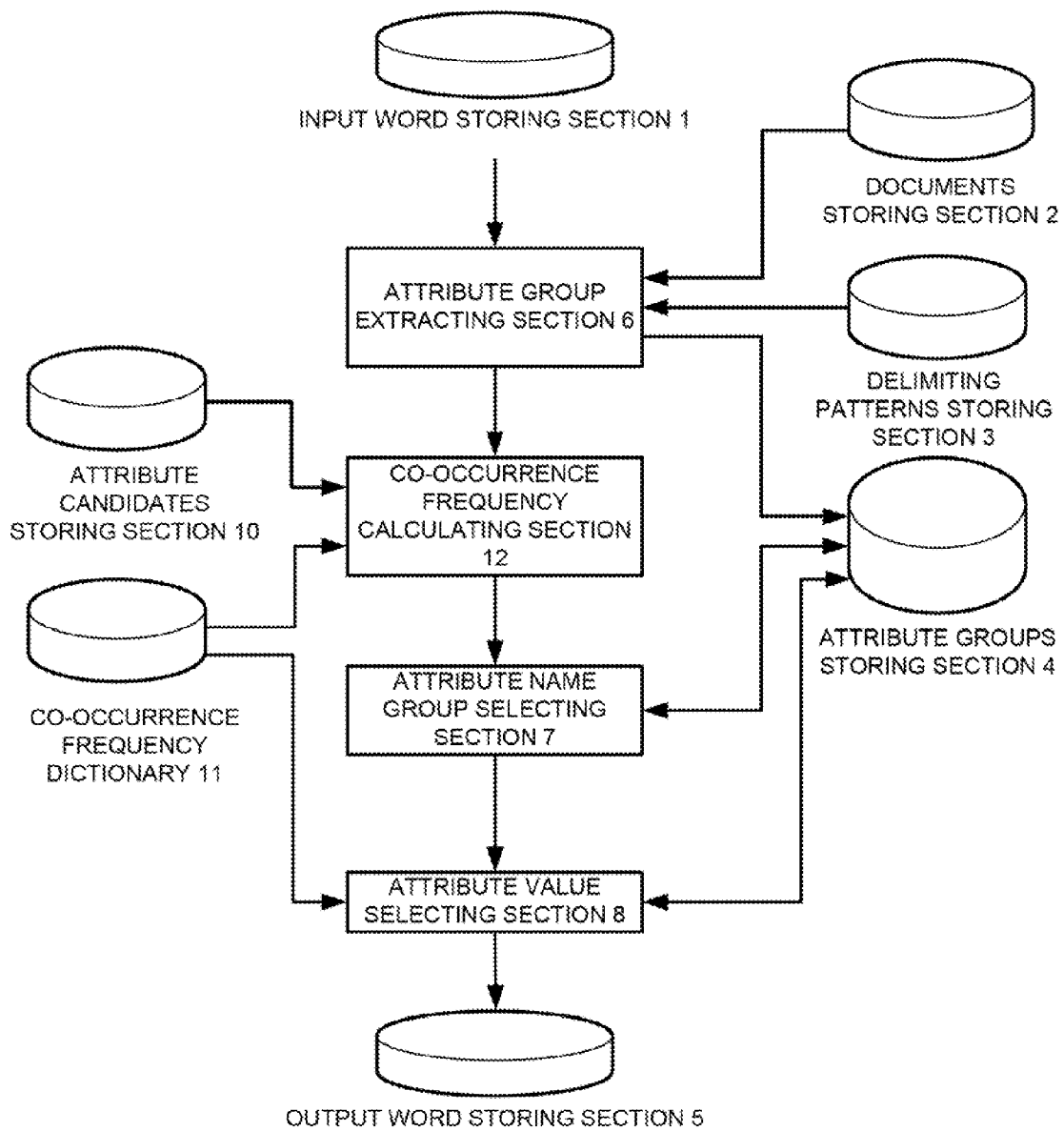

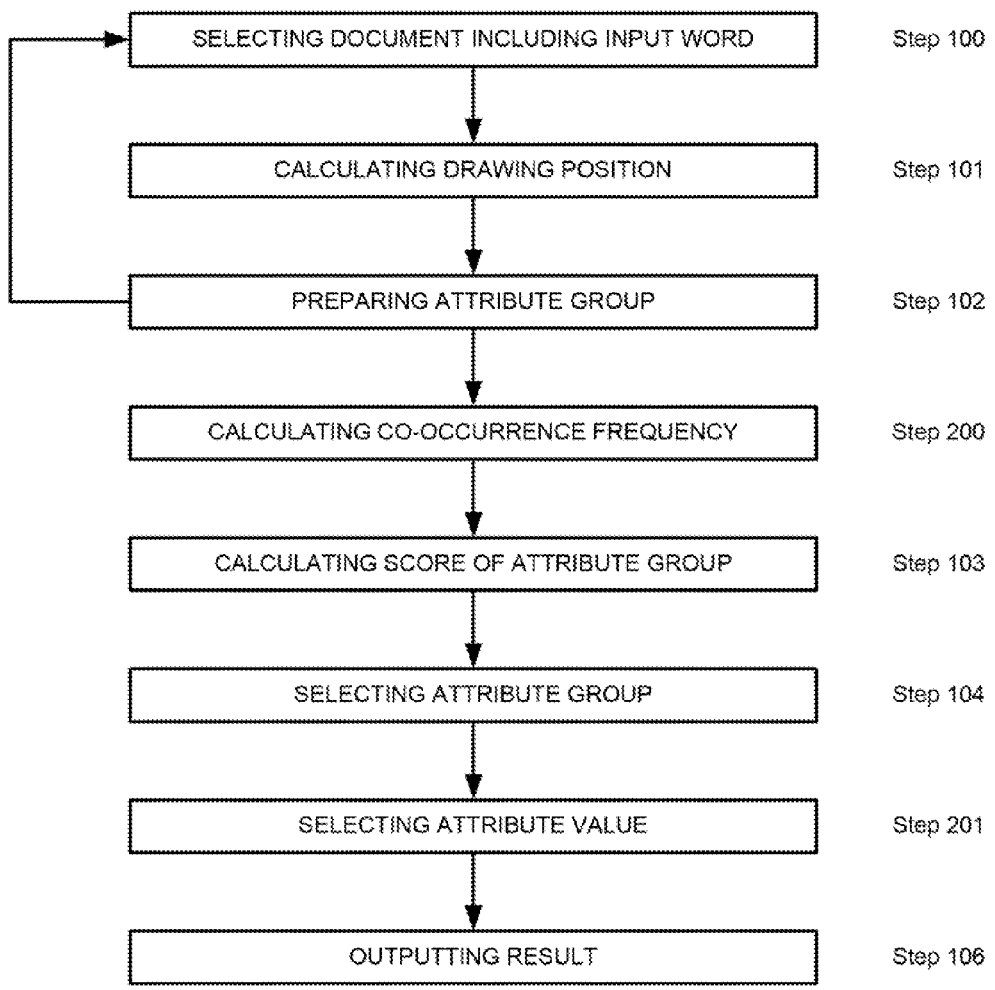

FIG. 14

| DOCUMENT ID | INPUT WORD | GROUP ID | WORD | X1, Y1 | X2, Y2 | SCORE | RE-INPUT |
|---|---|---|---|---|---|---|---|
| DOCUMENT A | PRODUCT A | 1 | PRODUCT NAME | 10, 10 | 40, 20 | 10/300 | Yes |
| DOCUMENT A | PRODUCT A | 1 | PRODUCT A | 10, 20 | 40, 30 | 20/300 | Yes |
| DOCUMENT A | PRODUCT A | 1 | PRODUCT B | 10, 30 | 40, 40 | 15/300 | Yes |
| DOCUMENT A | PRODUCT A | 1 | PRODUCT C | 10, 10 | 40, 20 | 10/300 | Yes |
| DOCUMENT A | PRODUCT A | 1 | PRODUCT I | 40, 10 | 80, 20 | 3/300 | Yes |
| DOCUMENT A | PRODUCT A | 1 | PRODUCT J | 10, 20 | 40, 30 | 6/300 | Yes |
| ⋮ | | | | | | | ⋮ |

| INPUT WORD | ATTRIBUTE NAME | ATTRIBUTE VALUE |
|---|---|---|
| PRODUCT A | CPU | 1 GHz |
| PRODUCT A | HDD | 2G |
| ... | ... | ... |

FIG. 18

| INPUT WORD | ATTRIBUTE NAME | ATTRIBUTE VALUE |
|---|---|---|
| PRODUCT A | CPU | 1 GHz |
| PRODUCT A | PRICE | 210,000 YEN |
| ... | ... | ... |

FIG. 19

| INPUT WORD | ATTRIBUTE NAME | ATTRIBUTE VALUE |
|---|---|---|
| PRODUCT A | CPU | 1 GHz |
| ... | ... | ... |
| PRODUCT I | CPU | 2 GHz |

ATTRIBUTE EXTRACTION METHOD, SYSTEM, AND PROGRAM

This application is the National Phase of PCT/JP2009/054170, filed Mar. 5, 2009, which is based upon and claims the benefit of priority from Japanese patent application No. 2008-55789, filed on Mar. 6, 2008, the disclosure of which is incorporated herein in its entirety by reference.

APPLICABLE FIELD IN THE INDUSTRY

The present invention relates to an attribute extraction method, a system, and a program.

BACKGROUND ART

The so-called attribute, which signifies properties and features that are inherent in things or matters, herein, is comprised of an attribute name and an attribute value. One thing or one matter has a plurality of the attributes. For example, when CPU of a certain personal computer are 1 GHz and a memory thereof is 500 MB, the number of the attributes of above personal computer is two, and one is attribute name CPU/attribute value 1 GHz, and the other is attribute name memory/attribute value 500 MB.

DISCLOSURE OF THE INVENTION

Problems to be Solved by the Invention

In the attribute extraction system of this kind, programs conforming to respective formats of documents need to be prepared manually, and preparation thereof demands time and labor.

Further, there exists a system of preparing a template for extracting the attribute in which positions of a word of the attribute name part and a word of the attribute value part have been described, and extracting the attribute based upon this. However, the attribute cannot be extracted with pattern templates other than the pre-defined pattern template.

Further, there exists a system of analyzing a tree structure of a tag from an HTML document and recognizing a repetitive pattern. However, while the above system can recognize the repetitive structure, it cannot determine which part is the attribute name and which part is the attribute value. Further, application to the documents other than the HTML document is difficult because the tag tree structure is required.

Thereupon, the present invention has been accomplished in consideration of the above-mentioned problems, and an object thereof is to provide an attribute extraction method capable of extracting the attribute name and the attribute value based upon drawing positions of strings or images of the document, a system thereof, and a program thereof.

Means to Solve the Problem

The present invention for solving the above-mentioned problems is an attribute extraction method of extracting a set of strings or images in the documents of which the drawing positions are arranged in one direction as an attribute group, calculating an attribute name score indicative of an extent to which the foregoing attribute group is an aggregation of the attribute names, selecting an attribute name group from the foregoing attribute group based upon the foregoing attribute name score, selecting the attribute group in which the strings or images identical to at least one string or image, or more of the foregoing attribute name group are contained, and yet the drawing position of the foregoing identical string or image is identical to that of the foregoing string or image of the foregoing attribute name group, extracting the attribute name from the foregoing strings or images of the identical drawing position, and extracting the attribute value corresponding to the foregoing attribute name from the strings or images of the foregoing selected attribute group except for the foregoing string or image of the identical drawing position.

Further, the present invention for solving the above-mentioned problems is an attribute extraction system including a document storing section having the documents stored therein, an attribute group extracting section for selecting a set of strings or images in the documents stored in the foregoing document storing section, of which the drawing positions are arranged in one direction, and extracting an attribute group, an attribute name group selecting section for calculating an attribute name score indicative of an extent to which the foregoing attribute group is an aggregation of the attribute names and selecting an attribute name group from the foregoing attribute group candidate based upon the foregoing attribute name score, and an attribute extracting section for selecting the attribute group in which the strings or images identical to at least one string or image, or more of the foregoing attribute name group are contained, and yet the drawing position of the foregoing identical string or image is identical to that of the foregoing string or image of the foregoing attribute name group, extracting an attribute name from the foregoing strings or images of the identical drawing position, and extracting an attribute value corresponding to the foregoing attribute name from the strings or images of the foregoing selected attribute group except for the foregoing string or image of the identical drawing position.

Further, the present invention for solving the above-mentioned problems is a program for causing an information processing device to execute an attribute group extraction process of extracting a set of strings or images in documents of which drawing positions are arranged in one direction as an attribute group, an attribute name group selection process of calculating an attribute name score indicative of an extent to which the foregoing attribute group is an aggregation of attribute names, selecting an attribute name group from the foregoing attribute group based upon the foregoing said attribute name score, an attribute name extraction process of selecting the attribute group in which the strings or images identical to at least one string or image, or more of the foregoing attribute name group are contained, and yet the drawing position of the foregoing identical string or image is identical to that of the foregoing string or image of the foregoing attribute name group, extracting an attribute name from the foregoing strings or images of the identical drawing position, and an attribute value extraction process of extracting an attribute value corresponding to the foregoing attribute name from the strings or images of the foregoing selected attribute group except for the foregoing string or image of the identical drawing position.

An Advantageous Effect of the Invention

The present invention makes it possible to extract the attribute name and the attribute value based upon the drawing positions of the strings or images of the document.

BRIEF DESCRIPTION OF THE DRAWINGS

FIG. 2 is a view illustrating one example of input words.

FIG. 3 is a view illustrating one example of a documents stored in a documents storing section 2.

FIG. 4 is a view illustrating one example of delimiting patterns stored in a delimiting patterns storing section 3.

FIG. 5 is a view illustrating one example of registration to an attribute groups storing section 4 that is performed by an attribute group extracting section 6.

FIG. 8 is an operational flowchart in the first embodiment.

FIG. 9 is a configuration view of the attribute extraction system in a second embodiment.

FIG. 10 is a view illustrating a storage example of an attribute candidates storing section 10.

FIG. 11 is a view illustrating one example of a co-occurrence frequency dictionary 11.

FIG. 12 is an operational flowchart in the second embodiment.

FIG. 14 is a view illustrating a storage example of a second attribute groups storing section 21.

FIG. 18 is a view illustrating a storage example of the output word storing section 5.

FIG. 19 is a view illustrating a storage example of the output word storing section 5.

Figure 1:
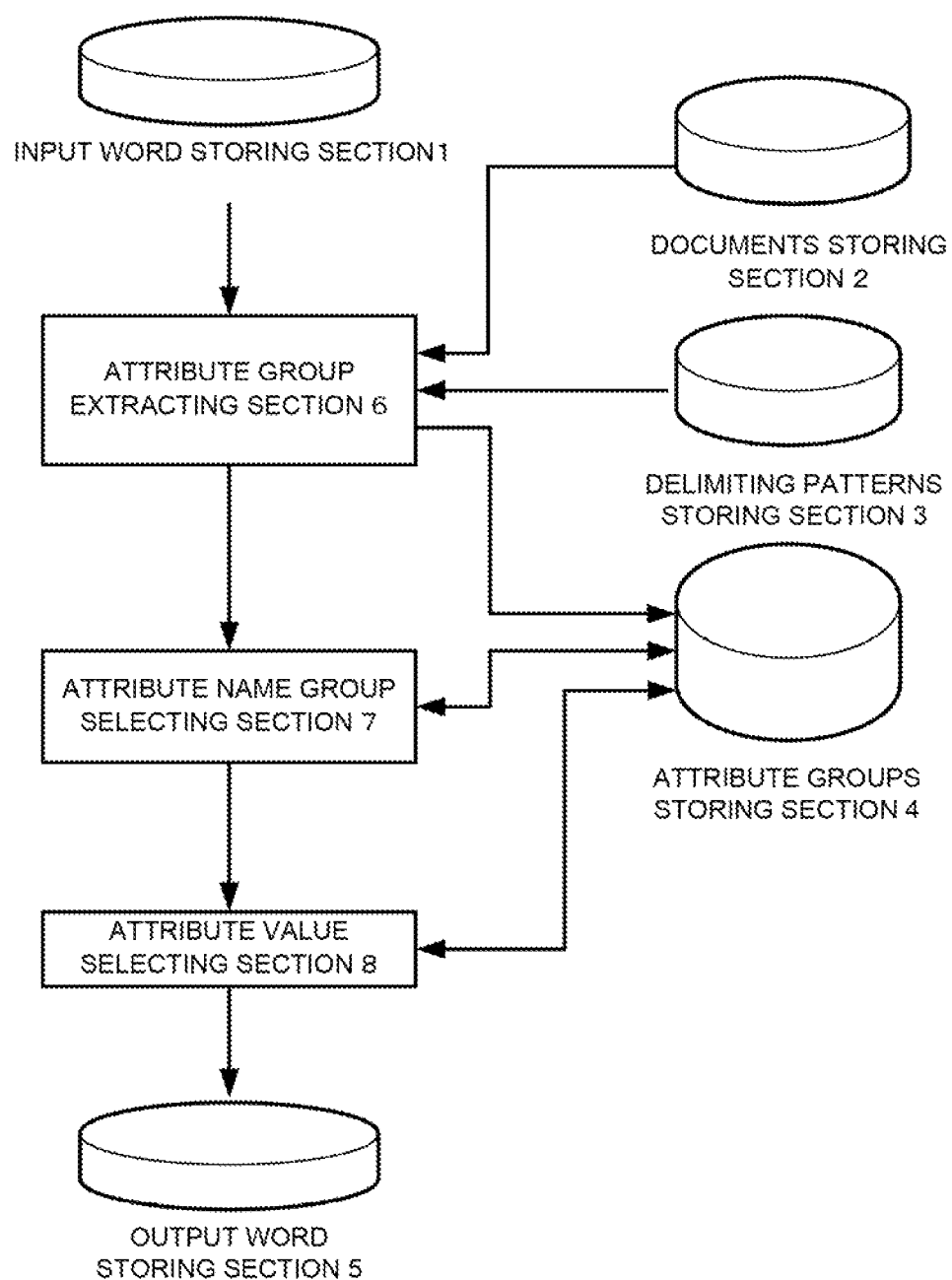
FIG. 1 is a configuration view of the attribute extraction system in a first embodiment.

DESCRIPTION OF NUMERALS 1 input word storing section
2 documents storing section
3 delimiting patterns storing section
4 attribute groups storing section
5 output word storing section
6 attribute group extracting section
7 attribute group selecting section
8 attribute value selecting section

BEST MODE FOR CARRYING OUT THE INVENTION

Embodiments of the present invention will be explained.
<First Embodiment>

The first embodiment will be explained with a reference to the accompanied drawings.

FIG. 1 is a configuration view of the attribute extraction system in the first embodiment.

The attribute extraction system in the first embodiment includes an input word storing section 1, a documents storing section 2, a delimiting patterns storing section 3, an attribute groups storing section 4, an output word storing section 5, an attribute group extracting section 6, an attribute group selecting section 7, and an attribute value selecting section 8.

The input word storing section 1 is a storing section having a list of the things and the matters, of which the attribute a user desires to know, stored therein. The user registers the input words indicative of affairs such as the things and the matters of which the attribute he/her desires to know to the input word storing section 1. One example of the input words is shown in FIG. 2. In an example of FIG. 2, ⌈commodity A⌋ to ⌈commodity E⌋ are registered as the input words.

The documents storing section 2 has the documents, being a target of extracting the attribute, stored therein. One example of the documents stored in the documents storing section 2 is shown in FIG. 3. In FIG. 3, a document ID for identifying the stored document and document data of the above document are stored correspondingly to each other. Additionally, the stored document could be not only a structured document such as HTML but also a text etc. between which a comma has been inserted.

The delimiting patterns storing section 3 has a delimiting patterns stored therein for delimiting the document into the strings or images (hereinafter, referred to as a block) constituting the structures such as a table and a list. Herein, the so-called delimiting pattern is a pattern for extracting the block that becomes an element of the structure of the table and the list, and there exist, for example, td tag inside and li tag inside of HTML, and delimiters such as ⌈,⌋ and ⌈:⌋ of the text document. One example of the delimiting patterns stored in the delimiting patterns storing section 3 is shown in FIG. 4.

The attribute group extracting section 6 delimits the document stored in the documents storing section 2 by the delimiting pattern stored in the delimiting patterns storing section 3. And, for each delimited bock, the attribute group extracting section 6 calculates the drawing position of the above block, extracts a set of the blocks of which the drawing positions are equal in a vertical direction or a traverse direction as an attribute group, and registers it to the attribute groups storing section 4. A general rendering engine is employed for calculating the drawing positions of the blocks. For example, web browser etc. that is publicly opened is employed as far as the HTML format document is concerned.

One example of the registration to the attribute groups storing section 4 that is performed by the attribute group extracting section 6 is shown in FIG. 5. In an example of FIG. 5, the document ID, the input word, a group ID, a word extracted from the block, an upper left position and a lower right position of the block, and a score are stored correspondingly to each other. Additionally, the score will be described later. Each row corresponds to the blocks within the attribute group. The document ID is indicative of a document ID in which the attribute group has appeared, the input word is indicative of an input word that has appeared before the position of the attribute group within the document, the group ID is indicative of an ID of the attribute group, and the upper left position and the lower right position are indicative of the drawing position of the block at the moment of drawing the document of the document ID. Additionally, the word of the identical group ID indicates that the group belongs to an identical attribute group.

In the following explanation, the word extracted from the block of the string or image is simply described as a word. Additionally, the technology of the character recognition etc. by the image can be employed for extracting the word from the blocks other than the block of the string, for example, the blocks of the image.

The attribute group selecting section 7 calculates an attribute name score (hereinafter, simply referred to as a score) indicative of an extent to which the attribute group is an aggregation of the attribute name with regard to the attribute group stored in the attribute groups storing section 4. For example, the attribute group selecting section 7 calculates the score from the statistics amount utilizing an occurrence frequency and an occurrence probability of the word, and selects the attribute group having a high possibility that the attribute name is described.

Figures 6, 7:
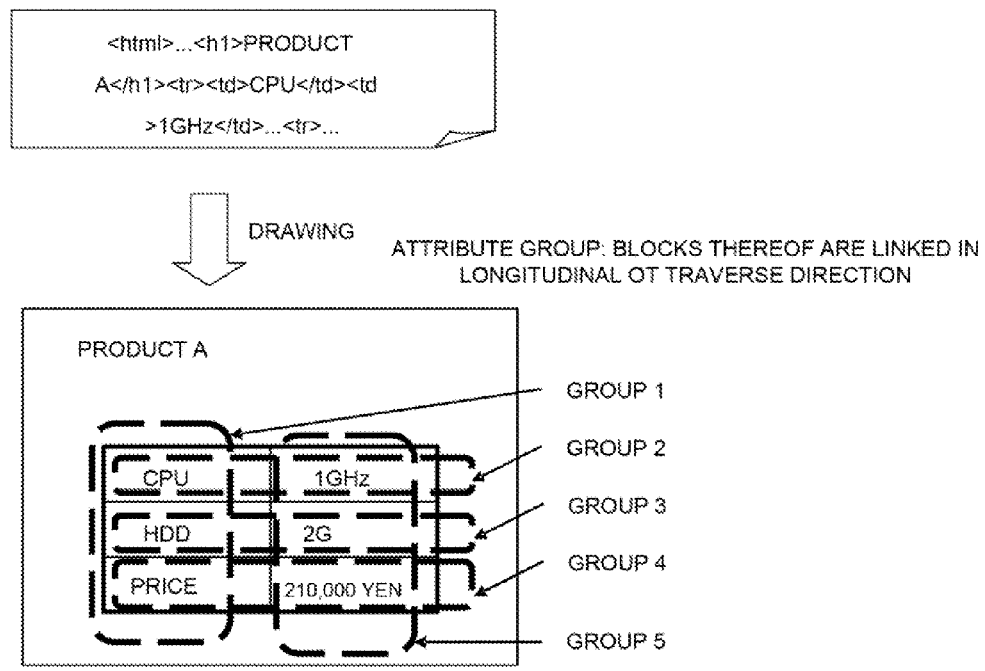
FIG. 6 is a view illustrating one example of registration of scores to the attribute groups storing section 4 that is performed by an attribute group selecting section 7.
FIG. 7 is a view for explaining the first embodiment.

For example, the attribute group selecting section 7 measures an average of the occurrence probabilities of the words of respective blocks, and defines it as a score of the attribute group. One example of the registration of the scores to the attribute groups storing section 4 that is performed by the attribute group selecting section 7 is shown in FIG. 6. Additionally, while, for each word extracted from the blocks within the attribute group, the occurrence probability of the above word is registered as a score in FIG. 6, an average of the occurrence probabilities of respective words may be registered as a score of one attribute group. And, the attribute group selecting section 7 selects the attribute name group having a high possibility that the attribute name is described based upon the score. Specifically, the attribute group selecting section 7 selects the attribute group candidates each having the score of which the value is equal to or more than a threshold, or the top several % of the attribute group candidates as an attribute name group.

The attribute value selecting section 8 defines the word of the attribute name group selected by the attribute group selecting section 7 as an attribute name, and extracts the attribute value corresponding to the above attribute name from the blocks of the attribute group having a block of which the drawing position overlaps that of the block of the word of the above attribute name. Additionally, with regard to the extraction of the attribute value, the attribute value is extracted from the words other than the word extracted as an attribute name, out of the words of the attribute group.

For example, in FIG. 7, when a group ID "1" is selected as the attribute name group, the drawing position of the block of a word [CPU] of the group ID "1" overlaps that of the block of a word [CPU] of a group ID "2". Thereupon, the attribute value selecting section 8 defines the word [CPU] as an attribute name, and extracts a word [1 GHz] of the block other than the block of the word [CPU] of the group ID "2" as an attribute value of the attribute name [CPU]. Likewise, with regard to the block of the word [HDD] and the block of the word [price] of the group ID "1" as well, the attribute value selecting section 8 selects the attribute value from the attribute group having a block of which the drawing position overlaps each of them. And, the attribute value selecting section 8 accumulates the attribute names and attribute values obtained herein in the output word storing section 5 together with the input word.

Additionally, while the word [CPU] of the group ID "1" and the word [CPU] of the group ID "2" are identical to each other in the explanation described above, the words do not always need to completely coincide with each other and are regarded to be identical to each other so long as they differ in the scope without departing from a spirit of the present invention. For example, now think about the case of the string ["CPU"], and the word that is appropriate as an attribute name is [CPU] and [" "] is not required. However, when the word ["CPU"] has been extracted in a stage of the extraction from the strings in a certain attribute group, and the word [CPU] has been has been extracted in a stage of the extraction from the strings in another attribute group, the work for extracting the attribute name and the attribute value is done by regarding the word ["CPU"] and the word [CPU] as being identical to each other.

Next, an operation of this embodiment will be explained.

FIG. 8 is an operational flowchart of this embodiment.

At first, the attribute group extracting section 6 selects one document including the input word from the documents storing section 2 (step 100). For example, in an example shown in FIG. 3, upon defining the input word as [product], the attribute group extracting section 6 selects a document [document A] including [product A].

Next, the attribute group extracting section 6 acquires the delimiting pattern from the delimiting patterns storing section 3, and calculates the drawing position of the block delimited by the delimiting pattern (step 101). A general rendering engine is employed for calculating the drawing positions of the blocks. For example, web browser etc. that is publicly opened is employed as far as the HTML format document is concerned. For example, in the document [document A], the attribute group extracting section 6 calculates respective drawing positions of portions [<td>CPU</td>], [<td>1 GHz</td>], and the like, to which [<td>*</td>], out of the delimiting patterns, conforms. The drawing position is specified by upper left coordinate (X,Y) and lower right coordinate (X,Y) on a screen. From now on, the coordinate on the screen is represented with an origin defined as upper left of the screen, an X axis as a traverse direction, and a Y axis as a longitudinal direction. Additionally, in the following explanation, it is assumed that the drawing position of [<td>CPU</td>] in the [document A] obtained by the calculation is upper left coordinate (10,10) and lower right coordinate (40,20), and the drawing position of [<td>1 GHz</td>] is upper left coordinate (40,10) and lower right coordinate (80,20).

Next, the attribute group extracting section 6 extracts the blocks that continue in a longitudinal direction or a traverse direction from the blocks delimited by the delimiting pattern as an attribute group, and stores it in the attribute groups storing section 4 (step 102). For example, the drawing position of [<td>CPU</td>] and that of [<td>1 GHz/td>] are identical to each other in the upper left Y coordinate and the lower right Y coordinate, and in addition, the lower right X coordinate of [<td>CPU</td>] and the upper left X coordinate of [<td>1 GHz</td>] are identical, whereby they continue in a traverse direction. Thus, this set is defined as an attribute group. Herein, they may not have an identical Y coordinate in a traverse direction, and error may be given hereto. Error may be given to continuous points as well. Likewise, the attribute group extracting section 6 extracts the attribute group candidate of which the blocks continue in a longitudinal direction. They may not have an identical X coordinate in a longitudinal direction as well, and error may be given hereto. Continuously, the attribute group extracting section 6, for the extracted attribute group, stores the document ID, the group ID, the word (the string except for the delimiter in the block or the string extracted from the block), the upper left coordinate, and the lower right coordinate thereof are stored in the attribute groups storing section 4. Additionally, the identical group ID is affixed to the identical attribute group candidate. Further, it is assumed that the score at this time point is empty. And, the attribute group extracting section 6 continues the foregoing until the documents including the input word are exhausted.

The attribute group selecting section 7 calculates the score of the attribute group, and affixes it to the attribute group (Step 103). The score, which is calculated, is a score indicating that the attribute group candidates are an aggregation of the attribute names, and larger the value, higher a possibility of being an aggregation of the attribute names. The identical expression is often used for the attribute name in a plurality of the documents. Thus, a possibility that the attribute group candidates, which include the words having a high occurrence frequency more numerously, are an aggregation of the attribute names is high.

For example, the attribute group score is defined as an average of the occurrence probabilities of respective words of the attribute group candidate.

$$\text{Score(group G)} = 1/J * \Sigma P_j$$

$$P_j = W_j/N$$

Where, $W_j$ is an occurrence frequency within the attribute group candidates of the j-th word of the attribute group candidate of a group G, N is a total of the occurrence frequencies of all of the words within the attribute group candidates, $P_j$ is an occurrence probability of the j-th word, and J is the number of the words of the group G.

For example, in an example of FIG. 5, the attribute group score of the group ID "1" (hereinafter, simply referred to as a group 1) is an average of the word occurrence probabilities of t∉CPU⌋, ⌈HDD⌋, and ⌈price⌋. When a total of the occurrence frequencies of all of the words, the occurrence frequency of ⌈CPU⌋, the occurrence frequency of ⌈HDD⌋, and the occurrence frequency of ⌈price⌋ are defined as 300, 5, 5, and 20, respectively, the score (group 1), being a score of the group 1, can be calculated as score (group 1) = ⅓ * (5/300+5/300+20/300)=10/300=0.033. Additionally, the occurrence probabilities of respective words are stored in the score field of the attribute groups storing section 4.

Further, the attribute group score of group ID "2" (hereinafter, referred to as a group 2) is an average of the word occurrence probabilities of ⌈CPU⌋ and ⌈1 GHz⌋.

When the occurrence frequency of ⌈1 GHz⌋ is defined as 3, the score (group 2), being a score of the group 2, can be calculated as score (group 2)=½ * (5/300+3/300)=4/300=0.013.

In addition, as another calculation method, the score can be defined as a total of differences with the average word occurrence frequencies. It will be explained by employing an equation below.

$$\text{Score(group G)} = \Sigma(WO - W_j)$$

$$WO = N/W$$

Where W is the number of all words within the attribute group candidates. WO is an average value of the word occurrence frequencies. Beside them, the score can be calculated as a total or an average of the word occurrence frequencies. However, the occurrence probability or the difference with the average is more suitably employed because employment of the simple word occurrence frequency causes the value to differ dependent upon size of the documents.

The attribute group selecting section 7 makes a reference to the score of the attribute group, and selects the attribute name group, being an aggregation of this attribute values (Step 104). With regard to the selection of the attribute name group, being an aggregation of this attribute values, the attribute group of which the score is equal to or more than a threshold pre-set in the system is selected as an attribute name group. For example, in the example described above, when the threshold is defined as 0.03, the group 1 is selected as an attribute name group.

Further, with regard to the selection of the attribute name group, the top several % of the groups having a higher score may be selected. The threshold can be set as a score in the case that dispersion due to size of the documents is alleviated, for example, in the case of employing the average of the word occurrence probabilities. The top several % of the groups having a high score ranking are preferably selected in the case that dispersion due to size of the documents exists, for example, in the case of the simple word occurrence probability because it is difficult to set the threshold. Further, two thresholds may be set simultaneously.

Next, the attribute value selecting section 8 extracts the attribute name, the attribute value, and the input word from the selected attribute name group and the attribute group that crosses this attribute name group (Step 105). Herein, the so-called attribute group crossing the attribute name group is an attribute group, which shares the block of the identical word with the selected attribute name group (the drawing positions are identical) and has the blocks continuing in a right-angle direction.

The attribute value selecting section 8 extracts the word that the attribute groups share as an attribute name, and the word that the attribute groups do not share as an attribute value. In addition, the attribute value selecting section 8 extracts the input word as well corresponding to the attribute group.

For example, in FIG. 7, one of the attribute groups crossing the attribute group 1 is the attribute group 2. The attribute group 1 is an attribute group of which the blocks continue in a longitudinal direction, and the attribute group 2 is an attribute group of which the blocks continue in a traverse direction. In addition, they share the block of the word ⌈CPU⌋. The attribute value selecting section 8 defines the word ⌈CPU⌋ that the attribute group 1 and the attribute group 2 share as an attribute name, and extracts the word ⌈1 GHz⌋ that the attribute group 2 does share with the attribute group 1, out of the words of the attribute group 2 (the words extracted from the blocks), as an attribute value. In addition, the attribute value selecting section 8 selects the input word ⌈product A⌋ of the attribute group 1. Herein, when the attribute value is identical to the input word, the attribute value selecting section 8 does not select the word as an attribute value. In addition, when a plurality of the words that are not shared exist in the attribute group that crosses the selected attribute group, the attribute value selecting section 8 selects the word having a maximum occurrence probability. Or, the attribute value selecting section 8 selects a plurality of the attribute values. Likewise, the attribute value selecting section 8 selects the attribute name, the attribute value, and the input word from the other attribute groups as well.

Finally, the attribute value selecting section 8 outputs the input word, the attribute name, and the attribute value, and stores them in the output word storing section 5 (step 107).

Figures 16, 17:
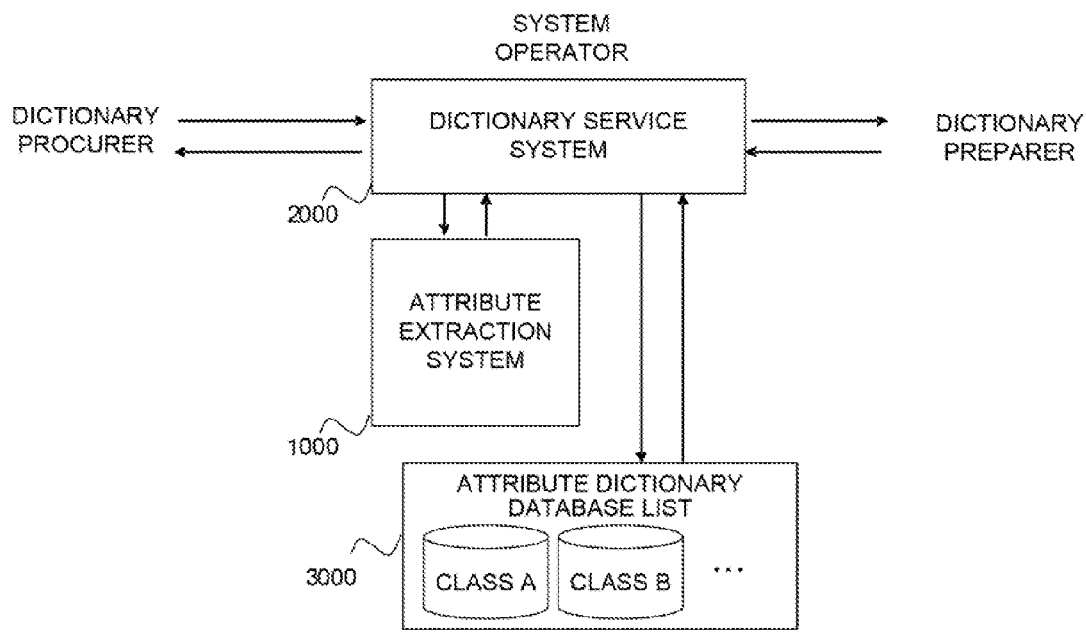
FIG. 16 is a block diagram in a fourth embodiment.
FIG. 17 is a view illustrating a storage example of an output word storing section 5.

One example of the output word storing section 5 is shown in FIG. 17. In the output word storing section 5 shown in FIG. 17, the input word, the attribute name, and the attribute value constitute one record, and the input word, the attribute name, and the attribute value are stored correspondingly to each other. For example, the input word ⌈product A⌋, the attribute name ⌈CPU⌋, and the attribute value ⌈1 GHz⌋ are stored correspondingly to each other.

In accordance with this embodiment, a template does not need to be prepared because the attribute group extracting section prepares the attribute group, dependent upon the drawing position of the word. The attribute name can be recognized with information of the statistical process for the words of the attribute group that is performed by the attribute group selecting section.

<Second Embodiment>

The second embodiment will be explained with a reference to the accompanied drawings.

A configuration view of the second embodiment is shown in FIG. 9.

The second embodiment, as compared with the first embodiment, differs in a point that an attribute candidates storing section 10, a co-occurrence frequency dictionary 11, and a co-occurrence frequency calculating section 12 are added.

The attribute candidates storing section 10 has a database stored therein in which candidates of the words each of which becomes an attribute name (hereinafter, referred to as an attribute candidate) have been accumulated. A storage example of the attribute candidates storing section 10 is shown in FIG. 10. It is the attribute candidate that is described in each record shown in FIG. 10.

The co-occurrence frequency dictionary 11 is a database in which the co-occurrence frequencies of the words partners of the attribute group candidate have been accumulated. Results calculated by the co-occurrence frequency calculating section 12 are accumulated. One example of the co-occurrence frequency dictionary 11 is shown in FIG. 11. The example shown in FIG. 11 is expressive of two words [word 1] and [word 2] that co-occur, and the co-occurrence frequency [frequency] thereof.

The co-occurrence frequency calculating section 12 loads the attribute candidate, and calculates a co-occurrence frequency of the attribute candidate and the word of the attribute group. The co-occurrence frequency calculating section 12 stores a result in the co-occurrence frequency dictionary. In an example shown in FIG. 11, word 1 is defined as an attribute candidate and word 2 as a word other than the attribute candidate.

The attribute value selecting section 8 makes a reference to the co-occurrence frequency dictionary, defines only the word of the attribute candidate or the word having a high co-occurrence frequency with the word of the attribute candidate, out of the words of the attribute group selected similarly to the case of the first embodiment, as an attribute name, and selects the attribute value only from the attribute group that crosses the blocks of this attribute name. Herein, the so-called word having a high co-occurrence frequency is a word having a frequency equal to or more than a lower-limit of the frequency, anyone of the top several % of the words having a higher frequency, or a word of which the occurrence probability is equal to or more than a threshold.

Next, an operation of the second embodiment will be explained.

FIG. 12 is an operational flowchart of the second embodiment.

At first, similarly to the case of the first embodiment, the attribute group extracting section 6 selects the document including the input word from the documents (step 100).

Similarly to the case of the first embodiment, the attribute group extracting section 6 acquires the delimiting pattern from the delimiting patterns, and calculates the drawing position for each of the blocks delimited by the delimiting pattern (step 101).

Similarly to the case of the first embodiment, the attribute group extracting section 6 extracts a set of the blocks that continue in a longitudinal direction or a traverse direction from the blocks delimited by the delimiting pattern as an attribute group, and saves it in the attribute groups storing section 4 (step 102).

The attribute group extracting section 6 continues the foregoing until the documents including the input word are exhausted.

Next, the co-occurrence frequency calculating section 12 makes a reference with the attribute candidates storing section 10 and the attribute groups storing section 4, calculate the frequencies of the attribute candidate and the words (the words extracted from the blocks) within the attributer group including this attribute candidate as a word (word extracted from the block), and stores them in the co-occurrence frequency dictionary 11 (step 200). For example, it is assumed that the attribute group including the attribute candidate [CPU] of FIG. 11 is the attribute group 1 of FIG. 6. The co-occurrence frequency calculating section 12 adds 1 to the co-occurrence frequency of each of the words of [HDD] and [price] within the attribute group 1, and [CPU]. That is, the co-occurrence frequency calculating section 12 adds the frequency 1 to the record of the word 1 [CPU] and the word 2 [HDD] and the record of the word 1 [CPU] and the word 2 [price] of the co-occurrence frequency dictionary 11, respectively. The co-occurrence frequency calculating section 12 calculate the co-occurrence frequencies with respect to all of the attribute candidates.

Next, similarly to the case of the first embodiment, the attribute name group selecting section 7 calculates the score of the attribute group, and affixes it to the attribute group (Step 103). And, similarly to the case of the first embodiment, the attribute name group selecting section 7 makes a reference to the score of the attribute group, and selects the attribute name group, being an aggregation of this attribute values (Step 104).

The attribute value selecting section 8 extracts the attribute name, the attribute value, and the input word from the attribute group that crosses the selected attribute name group. However, the attribute value selecting section 8 selects a set of the attribute name, being a word that has a high co-occurrence frequency on the co-occurrence frequency dictionary 11 with the words registered in the attribute candidates, out of the extracted attribute names, the attribute value, and the input word, and delivers it to the next step. Herein, the so-called word having a high frequency on the co-occurrence frequency dictionary 11 is a word of which a frequency is equal to or more than a lower-limit of the frequency, anyone of the top several % of words having a higher frequency, or a word of which the occurrence probability is equal to or more than a threshold. The threshold such as the frequency lower-limit is pre-stored in the system.

For example, when the occurrence probability is employed, the occurrence probability of a word Ri is calculated as follows.

$$\text{Occurrence probability } (Ri) = Fi/RN$$

Where Fi is a frequency of the word Ri of the co-occurrence word dictionary, and RN is a sum of all of the frequencies of the co-occurrence word dictionary.

Finally, the attribute value selecting section 8 outputs the input word, the attribute name, and the attribute value, and stores them in the output word storing section 5 (step 106).

One example of the output word storing section 5 is shown in FIG. 18. In the output word storing section 5 shown in FIG. 18, the input word, the attribute name, and the attribute value constitute one record, and the input word, the attribute name, and the attribute value are stored correspondingly to each other. For example, the input word [product A], the attribute name [CPU], and the attribute value [1 GHz] are stored correspondingly to each other. Further, [price] having a high co-occurrence frequency with an attribute candidate [liquid crystal] shown in FIG. 10 is output and is stored as an attribute name, and an attribute value [210,000 yen] of the above [price] as well is output and is stored.

In accordance with this embodiment, the attribute name candidate is prepared in advance, the co-occurrence frequency calculating section 12 calculates the co-occurrence frequency of the attribute name candidate and the word of the attribute group, and the attribute value selecting section 8 adopts the word having a high co-occurrence frequency as an attribute name, thereby allowing the precision to be enhanced all the more.

<Third Embodiment>

The third embodiment will be explained with a reference to the accompanied drawings.

Figure 13:
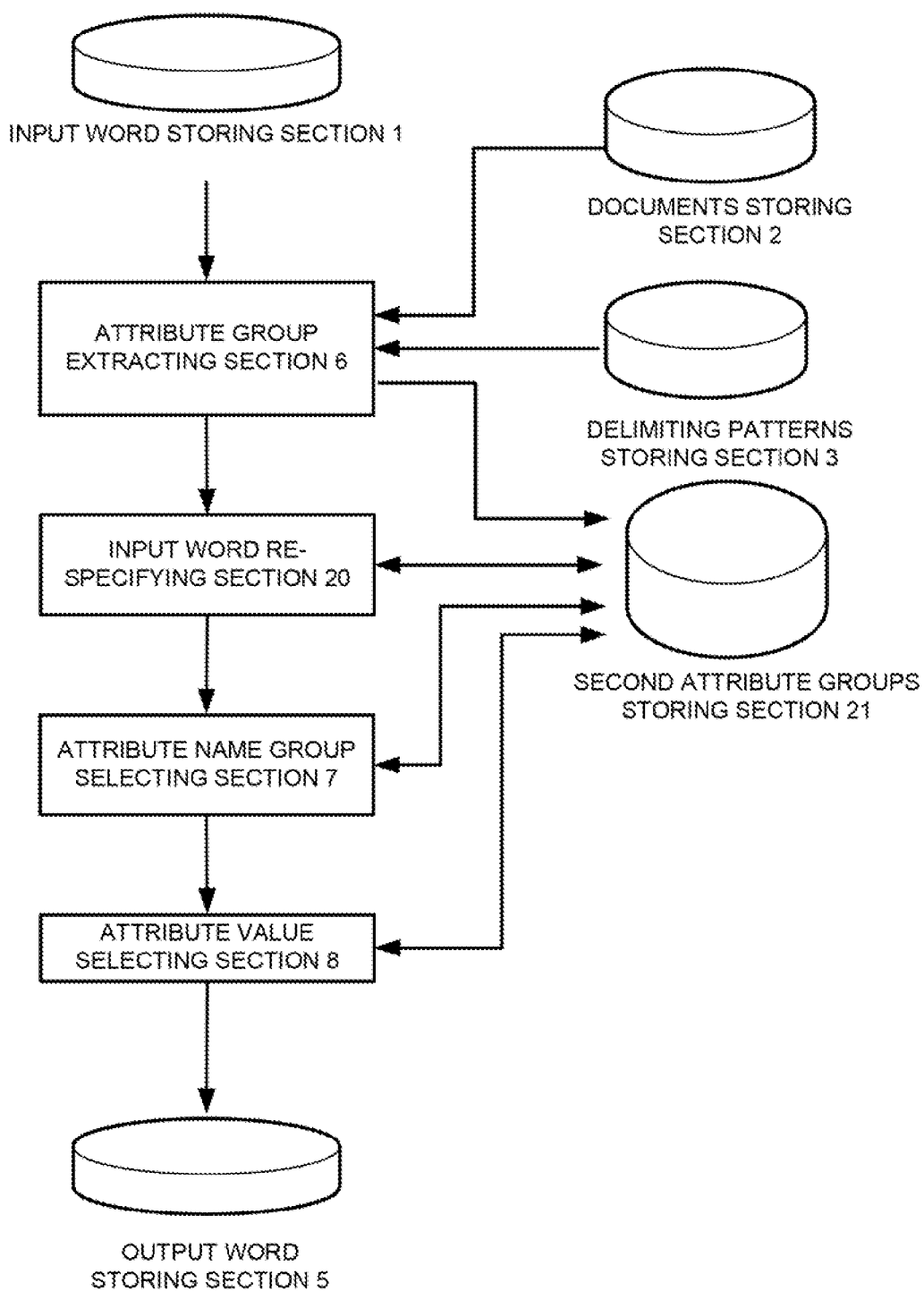
FIG. 13 is a configuration view of the attribute extraction system in a third embodiment.

FIG. 13 is a configuration view of the attribute extraction system in the third embodiment. Upon making a reference to FIG. 13, the third embodiment, as compared with the first embodiment, differs in a point that an input word re-specifying section 20 is added. Further, the attribute groups storing section is changed into a second attribute groups storing section 21.

A storage example of the second attribute groups storing section 21 is shown in FIG. 14.

The attribute group candidate stored in the second attribute groups storing section 21, as compared with the case of the embodiment described above, has a re-input field additionally added hereto indicating whether or not to handle the word as an input word again.

The input word re-specifying section 20 specifies the attribute group including many words having a category identical to that of the input word, out of the attribute group candidates including the input word. For example, there exists the attribute group including the input words, which are obtained from the result by the attribute group extracting section 6. The input word re-specifying section 20 specifies the attribute group including many input words, out of these attribute groups including the input words, and substitutes [YES] into the re-input field of the second attribute group candidate. Herein, the so-called attribute group including many input words is defined as an attribute group of which a ratio of the number of the input words appearing within the above attribute group over the number of the input words appearing in the identical document is larger than a threshold. Further, the so-called attribute group including many input words could be an attribute group of which the number of the input words appearing in the above attribute group is a lower limit of the number of the input words appearing within one, attribute group. In addition, the so-called attribute group including many input words may be defined as an attribute group simultaneously satisfying the two conditions.

Upon specifically explaining, when it is assumed that the input words are [product A], [product B], and [product C], the group ID 1 stored in the second attribute groups storing section 21 shown in FIG. 14 includes three words [product A], [product B], and [product C] similarly to the case of the input word. When it is assumed that the number of the input words having appeared in the [document A] is five, a ratio of the number of the input words appearing in this attribute group is ⅗. Herein, it is assumed that the condition is that a ratio of the number of the input words is 60% or more and yet the lower limit of the number of the input words after the inputting is three or more, the group ID 1 can be determined to be an attribute group including the word that could become a re-input word. From this result, [YES] is substituted into the re-input field of the attribute group of the group ID 1.

Next, an operation of the third embodiment will be explained.

Figure 15:
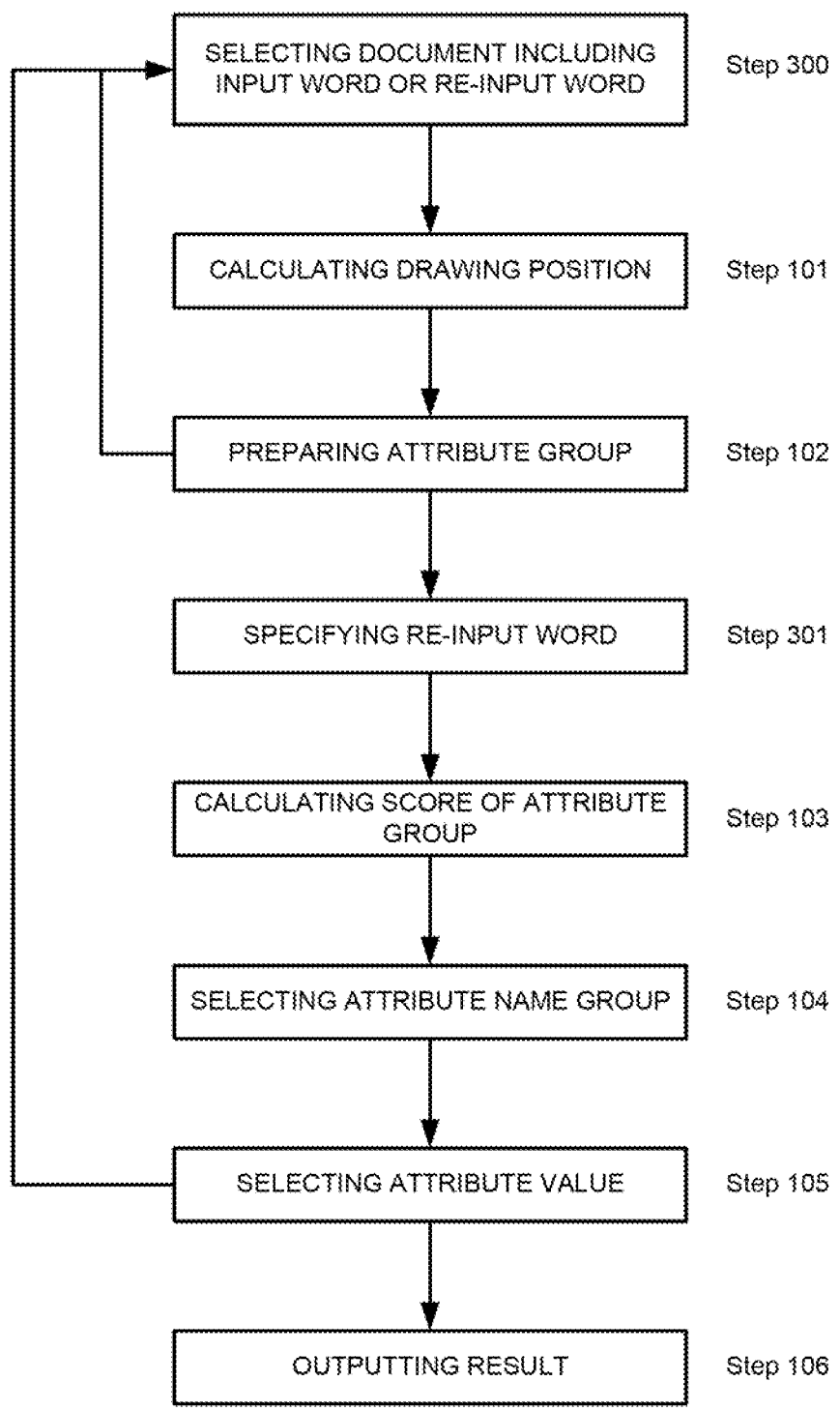
FIG. 15 is an operational flowchart in the third embodiment.

FIG. 15 is an operational flowchart of the third embodiment.

At first, the attribute group extracting section 6 selects, from the documents, the document in which the input word or the word of the record having [YES] in the re-input field of the attribute group, out of the attribute groups stored in the second attribute groups storing section 21, appears (step 300).

Next, similarly to the case of the first embodiment, the attribute group extracting section 6 acquires the delimiting pattern from the delimiting patterns, and calculates the drawing position for each of the blocks delimited by the delimiting pattern (step 301).

Next, similarly to the case of the first embodiment, the attribute group extracting section 6 extracts the blocks that continue in a longitudinal direction or a traverse direction from the blocks delimited by the delimiting pattern as an attribute group candidate, and saves it in the second attribute groups storing section 21 (step 102). And, the attribute group extracting section 6 continues the foregoing until the documents including the input word are exhausted.

Next, the input word re-specifying section 20 specifies the attribute group including the word of a category identical to that of the input word based upon the occurrence ratio and the occurrence frequency of the input word, substitutes [YES] into the re-input field of the second attribute group candidate, and specifies the re-input word (step 301).

Continuously, similarly to the case of the first embodiment, the attribute name group selecting section 7 calculates the score of the attribute group, and affixes it to the attribute group (Step 103).

The attribute group selecting section 7 makes a reference to the score of the attribute group, and selects the attribute name group, being an aggregation of the attribute values (Step 104).

The attribute value selecting section 8 extracts the attribute name, the attribute value, and the input word from the selected attribute name group and the attribute group that crosses this attribute name group (Step 105). However, the word to which [YES] has been affixed in the re-input field is handled as not the attribute value but the input word.

And, the attribute value selecting section 8 performs the above-mentioned work until the processing of the documents including all of the input words and the re-input words is finished.

Finally, the attribute value selecting section 8 outputs the input word, the attribute name, and the attribute value, and stores them in the output word storing section 5 (step 106).

One example of the output word storing section 5 is shown in FIG. 19. In the output word storing section 5 shown in FIG. 19, the input word, the attribute name, and the attribute value constitute one record, and the input word, the attribute name, and the attribute value are stored correspondingly to each other. For example, the input word [product A], the attribute name [CPU], and the attribute value [1 GHz] are stored correspondingly to each other. Further, [product I], being an re-input word, the attribute name [CPU], and the attribute value [2 GHz] are stored correspondingly to each other.

This embodiment makes it possible to acquire the attribute name and the attribute value as well associated with the product name of a category identical to that of the above input word because a configuration is made so that the words of a category identical to that of the input word can be increased by the input word re-specifying section.

<Fourth Embodiment>

The fourth embodiment will be explained with a reference to the accompanied drawings.

FIG. 16 is a block diagram of the fourth embodiment.

The fourth embodiment includes an attribute extraction system 1000 of the present invention, a dictionary service system 2000 for operating/managing the attribute extraction system 1000, and an attribute dictionary database list 3000 prepared by the attribute extraction system 1000.

A dictionary preparer prepares the attribute dictionary by utilizing the attribute extraction system 1000 and the dictionary service system 2000 that a system operator manages, and registers it to the attribute dictionary database list 3000.

An attribute dictionary procurer searches the attribute dictionary database list 3000 for the desired attribute dictionary, and procures the desired attribute dictionary from the dictionary preparer via the system operator if any.

The system operator receives a commission associated with delivery of money between the dictionary preparer and the dictionary procurer, and a fee of the attribute extraction system from the attribute dictionary preparer at a time point that the deal has been made.

Additionally, while in each of the foregoing embodiments, the input word storing section 1, the attribute group extracting section 6, the attribute group selecting section 7, the attribute value selecting section 8, and the like were configured with hardware, they can be also configured with CPU etc. that operates under a program.

The 1st mode of the present invention is characterized in that an attribute extraction method, comprising: extracting a set of strings or images in documents of which drawing positions are arranged in one direction as an attribute group; calculating an attribute name score indicative of an extent to which said attribute group is an aggregation of attribute names, and selecting an attribute name group from said attribute group based upon said attribute name score; selecting the attribute group in which the strings or images identical to at least one string or image, or more of said attribute name group are contained, and yet the drawing position of said identical string or image is identical to that of said string or image of said attribute name group; extracting an attribute name from said strings or image of the identical drawing position; and extracting an attribute value corresponding to said attribute name from the strings or images of said selected attribute group except for said string or image of the identical drawing position.

The 2nd mode of the present invention, in the above-mentioned mode, is characterized in that the attribute extraction method further comprising registering input words associated with affairs of which an attribute should be known, and extracting the document including said input word from a documents.

The 3rd mode of the present invention, in the above-mentioned mode, is characterized in that the attribute extraction method further comprising: delimiting the document into strings or images based upon a predetermined rule; calculating a drawing position of each of said strings or images; and defining a set of the strings or images of which the drawing positions are arranged in one direction as an attribute group.

The 4th mode of the present invention, in the above-mentioned mode, is characterized in that the attribute extraction method further comprising selecting the attribute group in which the strings or images identical to at least one string or image, or more of said attribute name group are contained, the drawing position of said identical string or image is identical to that of said string or image of said attribute name group, and yet the drawing position of the string or image exists in a right-angle direction with respect to a drawing position direction of the strings or images of said attribute name group.

The 5th mode of the present invention, in the above-mentioned mode, is characterized in that the attribute extraction method further comprising selecting the attribute group having said attribute name score larger than a predetermined threshold as an attribute name group.

The 6th mode of the present invention, in the above-mentioned mode, is characterized in that the attribute name score is an average of occurrence probabilities of respective strings or images of said attribute group.

The 7th mode of the present invention, in the above-mentioned mode, is characterized in that the attribute extraction method further comprising: calculating a co-occurrence probability of an attribute name candidate, being a candidate for the attribute name, and the string or image of the attribute group including said attribute name candidate; and selecting the attribute name from the strings or images selected based upon said attribute name candidate or the co-occurrence probability with said attribute name candidate, out of the strings or images of said attribute name group, and extracting the attribute value from the strings or images of the attribute group in which the strings or images including this attribute name are contained, and yet the drawing position of the string or image including said attribute name is identical to that of said attribute name group.

The 8th mode of the present invention, in the above-mentioned mode, is characterized in that the attribute extraction method further comprising extracting a second input word that could become the input word from the strings or images of the attribute group including said input word, and extracting the document including said second input word.

The 9th mode of the present invention is characterized in that an attribute extraction system, comprising: a document storing section having documents stored therein: an attribute group extracting section for selecting a set of strings or images in the documents stored in said document storing section, of which drawing positions are arranged in one direction, and extracting an attribute group; an attribute name group selecting section for calculating an attribute name score indicative of an extent to which said attribute group is an aggregation of attribute names, and selecting an attribute name group from said attribute group candidate based upon said attribute name score; and an attribute extracting section for selecting the attribute group in which the strings or images identical to at least one string or image, or more of said attribute name group are contained, and yet the drawing position of said identical string or image is identical to that of said string or image of said attribute name group, and extracting an attribute name from said strings or images of the identical drawing position, and extracting an attribute value corresponding to said attribute name from the strings or images of the said selected attribute group except for said string or image of the identical drawing position.

The 10th mode of the present invention, in the above-mentioned mode, is characterized in that the attribute extraction system further comprising an input word storing section having input words associated with affairs of which an attribute should be known stored therein, wherein said attribute group extracting section targets the documents including said input word.

The 11th mode of the present invention, in the above-mentioned mode, is characterized in that the said attribute group extracting section delimits the document into strings or images based upon a predetermined rule, calculates a drawing position of each of said strings or images, and defines a set of the strings or images of which the drawing positions are arranged in one direction as an attribute group.

The 12th mode of the present invention, in the above-mentioned mode, is characterized in that the attribute extracting section selects the attribute group in which the strings or images identical to at least one string or image, or more of said attribute name group are contained, the drawing position of said identical string or image is identical to that of said string or image of said attribute name group, and yet the drawing position of the string or image exists in a right-angle direction with respect to a drawing position direction of the strings or images of said attribute name group.

The 13th mode of the present invention, in the above-mentioned mode, is characterized in that the said attribute name group selecting section selects the attribute group having said attribute name score larger than a predetermined threshold as an attribute name group.

The 14th mode of the present invention, in the above-mentioned mode, is characterized in that the attribute name group selecting section calculates an average of occurrence probabilities of words being included the strings or images of said attribute group as the attribute name score.

The 15th mode of the present invention, in the above-mentioned mode, is characterized in that the attribute extraction system further comprising: an attribute candidate storing section having attribute candidates, being a candidate for a word that becomes an attribute name, respectively, stored therein; and an co-occurrence probability calculating section for calculating a co-occurrence probability of an attribute name candidate, being a candidate for the attribute name, and the string or image of the attribute group including said attribute name candidate, wherein said attribute extracting section selects the attribute name from the strings or images selected based upon said attribute name candidate or the co-occurrence probability with said attribute name candidate, out of the strings or images of said attribute name group, and extracts the attribute value from the strings or images of the attribute group in which the strings or images including this attribute name are contained, and yet the drawing position of the string or image including said attribute name is identical to that of said attribute name group.

The 16th mode of the present invention, in the above-mentioned mode, is characterized in that the attribute extraction system further comprising an input word extracting section for extracting a second input word that could become the input word from the strings or images of the attribute group including said input word.

The 17th mode of the present invention is characterized in that a program causing an information processing device to execute: an attribute group extraction process of extracting a set of strings or images in documents of which drawing positions are arranged in one direction as an attribute group; an attribute name group selection process of calculating an attribute name score indicative of an extent to which said attribute group is an aggregation of attribute names, and selecting an attribute name group from said attribute group based upon said attribute name score; an attribute name extraction process of selecting the attribute group in which the strings or images identical to at least one string or image, or more of said attribute name group are contained, and yet the drawing position of said identical string or image is identical to that of said string or image of said attribute name group, and, extracting an attribute name from said strings or images of the identical drawing position; and an attribute value extraction process of extracting an attribute value corresponding to said attribute name from the strings or images of said selected attribute group except for said string or image of the identical drawing position.

The 18th mode of the present invention, in the above-mentioned mode, is characterized in that the program causing the information processing device to execute a document extraction process of registering input words associated with affairs of which an attribute should be known, and extracting the document including said input word from a documents.

The 19th mode of the present invention, in the above-mentioned mode, is characterized in that the attribute name group selection process comprises the processes of: delimiting the document into strings or images based upon a predetermined rule; calculating a drawing position of said string or image; and extracting a set of the strings or images of which the drawing positions are arranged in one direction as an attribute group.

The 20th mode of the present invention, in the above-mentioned mode, is characterized in that said attribute name extraction process selects the attribute group in which the strings or images identical to at least one string or image, or more of said attribute name group are contained, the drawing position of said identical string or image is identical to that of said string or image of said attribute name group, and yet the drawing position of the string or image exists in a right-angle direction with respect to a drawing position direction of the strings or images of said attribute name group.

The 21st mode of the present invention, in the above-mentioned mode, is characterized in that the attribute name group selection process selects the attribute group having said attribute name score larger than a predetermined threshold as an attribute name group.

The 22nd mode of the present invention, in the above-mentioned mode, is characterized in that the attribute name score is an average of occurrence probabilities of respective strings or images of said attribute group.

The 23rd mode of the present invention, in the above-mentioned mode, is characterized in that the attribute name extraction process calculates a co-occurrence probability of an attribute name candidate, being a candidate for the attribute name, and the string or image of the attribute group including said attribute name candidate, and selects the attribute name from the strings or images selected based upon said attribute name candidate or the co-occurrence probability with said attribute name candidate, out of the strings or images of said attribute name group; and the said attribute value extraction process extracts the attribute value from the strings or images of the attribute group in which the strings or images including this attribute name are contained, and yet the drawing position of the string or image including said attribute name is identical to that of said attribute name group.

The 24th mode of the present invention, in the above-mentioned mode, is characterized in that the program causing the information processing device to execute a process of extracting a second input word that could become the input word from the strings or images of the attribute group including said input word, and extracting the document including said second input word.

Above, although the present invention has been particularly described with reference to the preferred embodiments, examples and modes thereof, it should be readily apparent to those of ordinary skill in the art that the present invention is not always limited to the above-mentioned embodiment and modes, and changes and modifications in the form and details may be made without departing from the sprit and scope of the invention.

The invention claimed is:

1. An attribute extraction method of extracting an attribute name and an attribute value associated with an input word inputted by a user from documents by a computer, wherein the computer:

extracts a document including the input word inputted by the user from the pre-stored documents;

delimits said extracted document into strings or images based upon a predetermined rule, and calculates a drawing position of each of said delimited strings or images;

extracts a group of the strings or images of which said calculated drawing positions are arranged in one direction as an attribute group;

calculates an attribute name score indicative of an extent to which said attribute group is an aggregation of attribute names based upon a statistical index employing the appearance number of each word in all of the attribute groups that is obtained from said delimited strings or images of said attribute group, and selects an attribute name group from said attribute group based upon said attribute name score;

selects, from said extracted attribute group, the attribute group in which the strings or images identical to said delimited strings or images of said attribute name group are contained, and the drawing position of the above identical string or image is identical to that of said attribute name group;

extracts an attribute name from the strings or image of which the drawing position is identical between said attribute name group and said selected attribute group; and extracts an attribute value corresponding to said extracted attribute name from the strings or images of said selected attribute group except for the string or image corresponding to said extracted attribute name.

2. The attribute extraction method according to claim 1, wherein the computer selects the attribute group in which the drawing position of each of said delimited strings or images lines up in a right-angle direction with respect to a direction in which the drawing position of each of said delimited strings or images of said attribute name group lines up.

3. The attribute extraction method according to claim 1, wherein the computer selects the attribute group having said attribute name score larger than a predetermined threshold as an attribute name group.

4. The attribute extraction method according to claim 1, wherein said attribute name score is an average of occurrence probabilities of respective strings or images of said attribute group.

5. The attribute extraction method according to claim 1, wherein the computer:
calculates a co-occurrence probability of a pre-stored attribute name candidate, being a candidate for the attribute name, and each string or image of the attribute group including said attribute name candidate; and
extracts the attribute value from the strings or images of the attribute group in which the attribute name of which said co-occurrence probability is higher than a predetermined value, out of said extracted attribute manes, is contained as the string or image.

6. The attribute extraction method according to claim 1, wherein the computer:
extracts a second input word belonging to a category identical to that of said input word from the strings or images of the attribute group in which said input word is contained in the string or image; and
extracts the document including said second input word.

7. An attribute extraction system, comprising:
a document storage having documents stored therein;
an attribute group extracting section, implemented by a processor, configured to extract the document including an input word inputted by a user from said document storage, delimits said extracted document into strings or images based upon a predetermined rule, and calculates a drawing position of each of said delimited strings or images, and extracts a group of the strings or images of which said calculated drawing positions are arranged in one direction as an attribute group;
an attribute name group selector, implemented by the processor, configured to calculate an attribute name score indicative of an extent to which said attribute group is an aggregation of attribute names based upon a statistical index employing the appearance number of each word in all of the attribute groups that is obtained from said delimited strings or images of said attribute group, and selects an attribute name group from said attribute group based upon said attribute name score; and
an attribute extracting section, implemented by the processor, configured to select, from said extracted attribute group, the attribute group in which the strings or images identical to said delimited strings or images of said attribute name group are contained, and the drawing position of the above identical string or image is identical to that of said attribute name group, and extracts au attribute name from the strings or images of which the drawing position is identical between said attribute name group and said selected attribute group, and extracts an attribute value corresponding to said extracted attribute name from the strings or images of the said selected attribute group except for the string or image corresponding to said extracted attribute name.

8. The attribute extraction system according to claim 7, wherein said attribute extracting section is further configured to select the attribute group in which the drawing position of each of said delimited strings or images lines up in a right angle direction with respect to a direction in which the drawing position of each of said delimited strings or images of said attribute name group lines up.

9. The attribute extraction system according to claim 7, wherein said attribute name group selector is further configured to select the attribute group having said attribute name score larger than a predetermined threshold as an attribute name group.

10. The attribute extraction system according to claim 7, wherein said attribute name group selector is further configured to calculate an average of occurrence probabilities of words being included in the strings or images of said attribute group as the attribute name score.

11. The attribute extraction system according to claim 7, further comprising:
an attribute candidate storage having attribute name candidates, being a candidate for a word that becomes an attribute name, respectively, stored therein; and
a co-occurrence probability calculator, implemented by the processor, configured to calculate a co-occurrence probability of said attribute name candidate, and each string or image of the attribute group including said attribute name candidate,
wherein said attribute extracting section is further configured to extract the attribute value from the strings or images of the attribute group in which the attribute name of which said co-occurrence probability is higher than a predetermined value, out of said extracted attribute names, is contained as the string or image.

12. The attribute extraction system according to claim 7, further comprising:
an input word extracting section, implemented by the processor, configured to extract a second input word belonging to a category identical to that of said input word from the strings or images of the attribute group in which said input word is contained in the string or image.

13. A non-transitory computer readable storage medium storing a program for extracting an attribute name and an attribute value associated with an input word inputted by a user from documents by a computer recorded therein, said program causing the computer to execute:
an extraction process of extracting a document including the input word inputted by the user from the pre-stored documents;
a process of delimiting said extracted document into strings or images based upon a predetermined rule, and calculating a drawing position of each of said delimited strings or images;

an attribute group extraction process of extracting a group of the strings or images of which said calculated drawing positions are arranged in one direction as an attribute group;

an attribute name group selection process of calculating an attribute name score indicative of an extent to which said attribute group is an aggregation of attribute names based upon a statistical index employing the appearance number of each word in all of the attribute groups that is obtained from said delimited strings or images of said attribute group, and selecting an attribute name group from said attribute group based upon said attribute name score;

an attribute name extraction process of selecting, from said extracted attribute group, the attribute group in which the strings or images identical to said delimited strings or images of said attribute name group are contained, and the drawing position of the above identical string or image is identical to that of said attribute name group, and extracting an attribute name from the strings or images of which the drawing position is identical between said attribute name group and said selected attribute group; and an attribute value extraction process of extracting an attribute value corresponding to said extracted attribute name from the strings or images of said selected attribute group except for the string or image corresponding to said extracted attribute name.

14. The non-transitory computer readable storage medium according to claim 13, wherein said attribute name extraction process selects the attribute group in which the drawing position of each of said delimited strings or images lines up in a right-angle direction with respect to a direction in which the drawing position of each of said delimited strings or images of said attribute name group lines up.

15. The non-transitory computer readable storage medium according to claim 13, wherein said attribute name group selection process selects the attribute group having said attribute name score larger than a predetermined threshold as an attribute name group.

16. The non-transitory computer readable storage medium according to claim 13, wherein said attribute name score is an average of occurrence probabilities of respective strings or images of said attribute group.

17. The non-transitory computer readable storage medium according to claim 13:

wherein said attribute name extraction process calculates a co-occurrence probability of a pre-stored attribute name candidate, being a candidate for the attribute name, and each string or image of the attribute group including said attribute name candidate; and wherein said attribute value extraction process extracts the attribute value from the strings or images of the attribute group in which the attribute name of which said co-occurrence probability is higher than a predetermined value, out of said extracted attribute names, is contained as the string or image.

18. The non-transitory computer readable storage medium according to claim 13, said program causing the computer to execute a process of extracting a second input word belonging to a category identical to that of said input word from the strings or images of the attribute group in which said input word is contained in the string or image, and extracting the document including said second input word.

* * * * *